United States Patent [19]

Vetsch et al.

[11] Patent Number: 4,459,458

[45] Date of Patent: Jul. 10, 1984

[54] MACHINE TOOL WITH LASER HEAT TREATING

[75] Inventors: Rudolf A. Vetsch, Walton Hills; Gerald J. Romito, Solon, both of Ohio

[73] Assignee: The Warner & Swasey Company, Cleveland, Ohio

[21] Appl. No.: 413,120

[22] Filed: Aug. 30, 1982

[51] Int. Cl.³ .................................................. B23K 27/00
[52] U.S. Cl. ........................... 219/121 L; 219/121 FS; 219/121 LY
[58] Field of Search ................. 219/121 LG, 121 LH, 219/121 LJ, 121 LR, 121 FS, 121 L, 121 LY, 121 LM, 121 LN, 121 EJ, 121 EK, 121 EH; 82/1 R, 1 C; 408/56; 409/136

[56] References Cited

U.S. PATENT DOCUMENTS

| | | | |
|---|---|---|---|
| 3,848,104 | 11/1974 | Locke | 219/121 |
| 3,957,339 | 5/1976 | Engel | 350/6 |
| 4,015,100 | 3/1977 | Gnanamuthu et al. | 219/121 |
| 4,074,104 | 2/1978 | Fulkerson | 219/121 LY X |
| 4,116,542 | 9/1978 | Moncur et al. | 350/321 |
| 4,170,726 | 10/1979 | Okuda | 219/121 FS X |
| 4,229,640 | 10/1980 | Castellani Longo | 219/121 |
| 4,270,845 | 6/1981 | Takizawa et al. | 350/299 |
| 4,304,978 | 12/1981 | Saunders | 219/121 |
| 4,335,296 | 6/1982 | Bredow | 219/121 LG |

OTHER PUBLICATIONS

SME Technical Paper, Mar., 75-570, by Michael Yessik & R. P. Scherer, American Machinest, May 1976, pp. 107-111, by S. L. Engel.

Primary Examiner—C. L. Albritton
Attorney, Agent, or Firm—Howard G. Massung

[57] ABSTRACT

A machine tool (10) for removing metal from a workpiece (20) including a laser (14) for surface heat treating of the workpiece (20). Tools which engage the workpiece (20) for metal removal are supported by a tool turret (26) which is movable along two axes with respect to the workpiece (20) to bring tools into position for metal removal. The laser beam output is connected by beam directing assembly (48), including a telescoping tube arrangement, to a focusing head (60) which can focus the laser beam. The focusing head (60) can be engaged and positioned by the tool turret (26). Tool turret (26) is positioned to maintain the laser beam slightly defocused on the workpiece. A coating spray nozzle (62) is positioned with the laser head (60) and is used for coating the workpiece (20) before laser heat treating. A locking mechanism is provided for locking the head (60) to the beam directing assembly (48). When not being used for heat treating the beam directing assembly, (48) along with the locked focusing head (60) is retracted to a home position. When in the home position a protective cover (90) is positioned over the beam directing assembly. The laser beam is delivered thru telescoping protective tubes by reflective mirrors, which allows the focusing head (60) and directed laser beam to follow motion of the tool turret (26). Flexible connections are provided for connecting the necessary air, water, and coating to the various beam delivery and coating members.

21 Claims, 12 Drawing Figures

MACHINE TOOL WITH LASER HEAT TREATING

BACKGROUND OF THE INVENTION

1. Technical Field

The present invention relates to machine tools and more particularly to a machine tool which includes laser heat treating.

2. Background Art

Heat treating, metal surfaces with lasers is known. In American Machinist, May, 1976 pages 107 thru 111 and in SME Technical Paper MAR 75-570, both of whose teachings are herein incorporated by reference, heat treating and surface hardening with lasers is described in detail.

Transformation hardening is a solid state transformation of iron carbide in ferrous materials, at elevated tempertures, followed by a very rapid cooling rate to produce a hardened micro-sturcture. The temperature at which the solid state transformation takes place is approximately 1700 degrees F. Martensite is the iron carbide structure that is produced upon very rapid cooling from the transformation temperature. Martensite is the structure that produces the high hardness in ferrous materials. The rate at which the heated material is cooled from the transformation temperature is critical in transformation hardening. In conventional heat treating operations high cooling rates are achieved by chilling or quenching the workpiece with oil, water, or forced air. The faster the cooling rate the greater the degree of martensite formation and the higher the hardness. The carbon content of the material also determines final hardness; the higher the carbon content the greater its potential hardness.

$CO_2$ lasers which have a high energy output are ideally suited for transformation hardening since they can provide for a very rapid heat input into the workpiece and extremely high cooling rates can be achieved as the heat is conducted into the workpieces by its own thermal mass.

Transformation hardening using a $CO_2$ laser is accomplished by traversing the focused or defocused laser beam over a surface of the workpiece that has been prepared with an absorptive coating. Case depth obtainable with laser heat treating is a function of laser power, laser spot size, treatment speed, and the thermal properties of the workpiece material. The laser power and the laser spot size determines the power density of the process. The power density and the treatment speed are the two most critical parameters in laser heat treating. These parameters determine the actual heat input into the workpiece surface. The very fast heat input rapidly raises the surface temperature of the material above the transformation temperature but below the melting temperature.

Thermal properties of the material determine how rapidly the absorbed thermal energy is conducted into the interior of the workpiece. A rapid cooling rate promotes the metalurgical transformation of martensite. Cooling rates that exceed those of induction hardening are possible with laser heat treating. Laser heat treating therefore is capable of producing hardened cases of a few Rockwell points harder than those produced by induction hardening. The very rapid cooling rate that occurs in the material qualifies laser heat treating as a self quenching hardening process that does away with the need for an external quenching media.

At some depth the thermal energy dissipates and the temperature of the material does not rise above the transformation. This establishes the penetration depth of the hardened case. Increasing the power density or decreasing the treatment speed to promote a deeper penetration increases the risk of raising the surface above the melting temperature.

Since ferrous materials are normally reflective of laser energy, it is desirable to apply a coating to the workpiece surface to enhance energy absorption. Various coatings are available for this purpose, including magnesium, potassium, and zinc phosphates, indian ink, colliodal graphite, black spray paint, and black oxide coatings.

Turning machines having an NC control with indexable tool turrets supported for two axes movement are also known in the art. Typically, the tool turret is positioned by two stacked orthogonally positionable slides which are movable in response to commands from the controller. A machine tool as described in U.S. patent application Ser. No. 199,019 by R. D. Erickson, whose teachings are herein incorporated by reference, describes a machine tool having an indexable tool turret which is movable independently or simultaneously along an X axis and Z axis.

DISCLOSURE OF THE INVENTION

The present invention relates to a numerically controlled (NC) machine tool which removes metal from a workpiece and utilizes a laser for heat treating selected surfaces of the machined workpiece. The machine tool includes a workpiece gripper for engaging and holding the workpiece while a metal cutting tool, supported by a suitable tool support device, is brought into engagement with the workpiece. The tool support device, which can be an indexable tool turret, is capable of movement along two axes. A laser provides a high energy output laser beam which is directed by a suitable beam delivery assembly to a focusing head. Coupling means are provided for connecting the focusing head to the total support device. The total support device is then moved, under the control of a suitable electronic controller, to bring the focusing head into position for directing the laser beam onto the workpiece for surface hardening. A bracket which supports the laser focusing head also supports a coating spray nozzle which can direct paint or a suitable coating onto the workpiece to increase efficiency of the laser heat treating. The bracket which supports the paint nozzle and laser focusing head is engaged and moved by the tool support device during use.

The beam delivery assembly includes telescopic protective tubes for directing the laser beam and which provide for two axes positioning to allow the focusing head to follow movement of the tool support device or turret. A home position is provided for the beam delivery assembly where the laser focusing head is positioned when not in use. A suitable locking device is provided on the beam delivery assembly for engaging the support bracket when the focusing head is not in use. A positionable cover is provided for shielding the beam delivery system when it is in the home position. Flexible connections are provided to bring the necessary cooling water, paint, and air to the laser head and associated beam delivery assembly. When used with a turning machine tool the workpiece is turned to the desired configuration by tools supported from a tool turret. The tool turret is indexed and positioned by a suitable controller which is properly programmed. After turning the protective cover is lowered and the beam delivery assembly is extended to a position where the bracket which supports the focusing head can be engaged. The bracket is then engaged and moved to bring the coating nozzle and focusing head to desired positions for heat treating. Selected portions of the workpiece are then coated and laser heat treated in response to signals from the controller.

The laser is used to create localized surface hardening of selective areas on the workpiece after turning. Typical case depth is 0.75 mm (0.030 inches). The workpiece is coated prior to lasing to increase laser energy absorbtivity. The laser beam is reflected by several mirrors through a lens in the focusing head. The focusing head is positioned to concentrate the laser beam at a slightly defocused spot on the workpiece. All motion of the laser beam is controlled by positioning of the machine tool slides by their associated drives in response to signals from the controller.

BRIEF DESCRIPTION OF THE DRAWINGS

For a better understanding of this invention reference may be had to the preferred embodiment exemplary of the invention shown in the accompanying drawings in which.

BEST MODE FOR CARRYING OUT THE INVENTION

Figure 1:
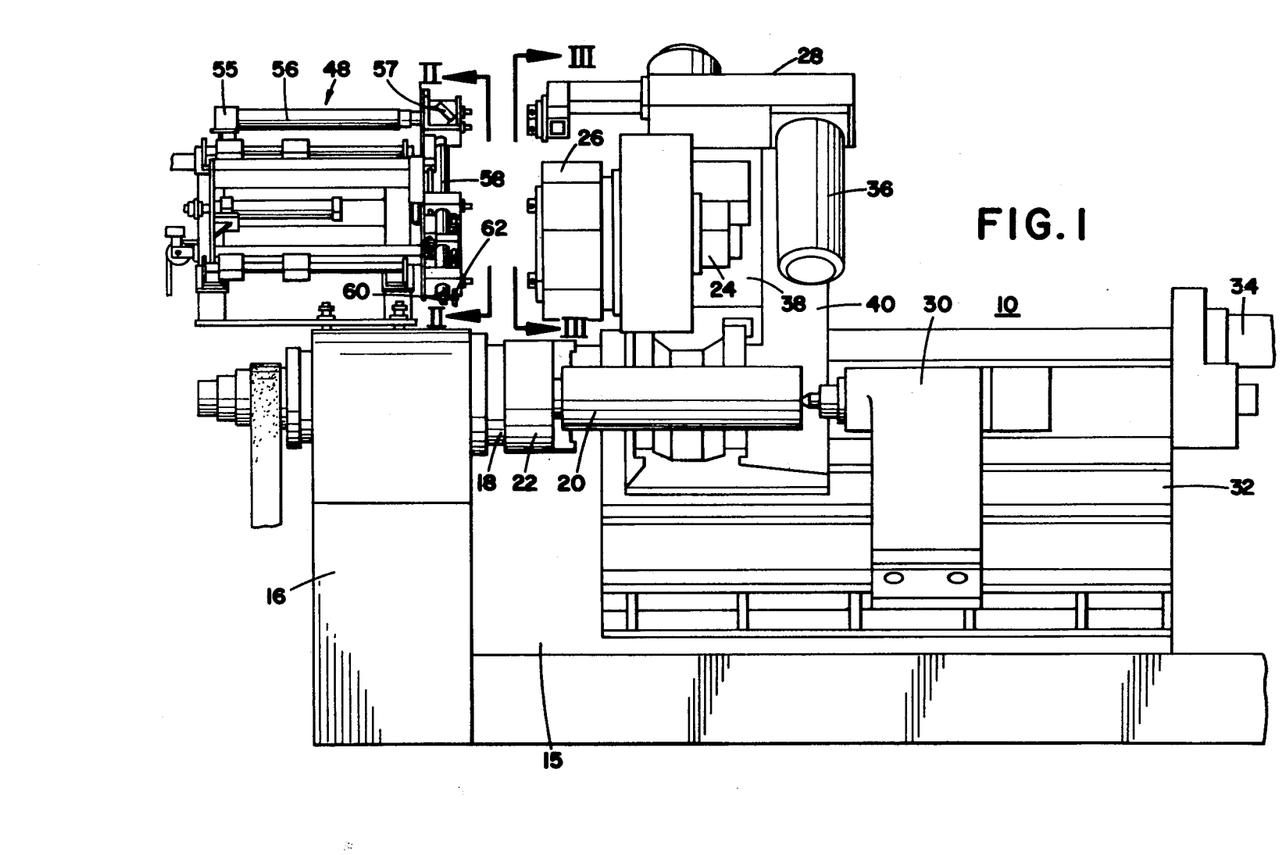
FIG. 1 is a front view of a machine tool constructed according to the teaching of the present invention.
Figure 11:
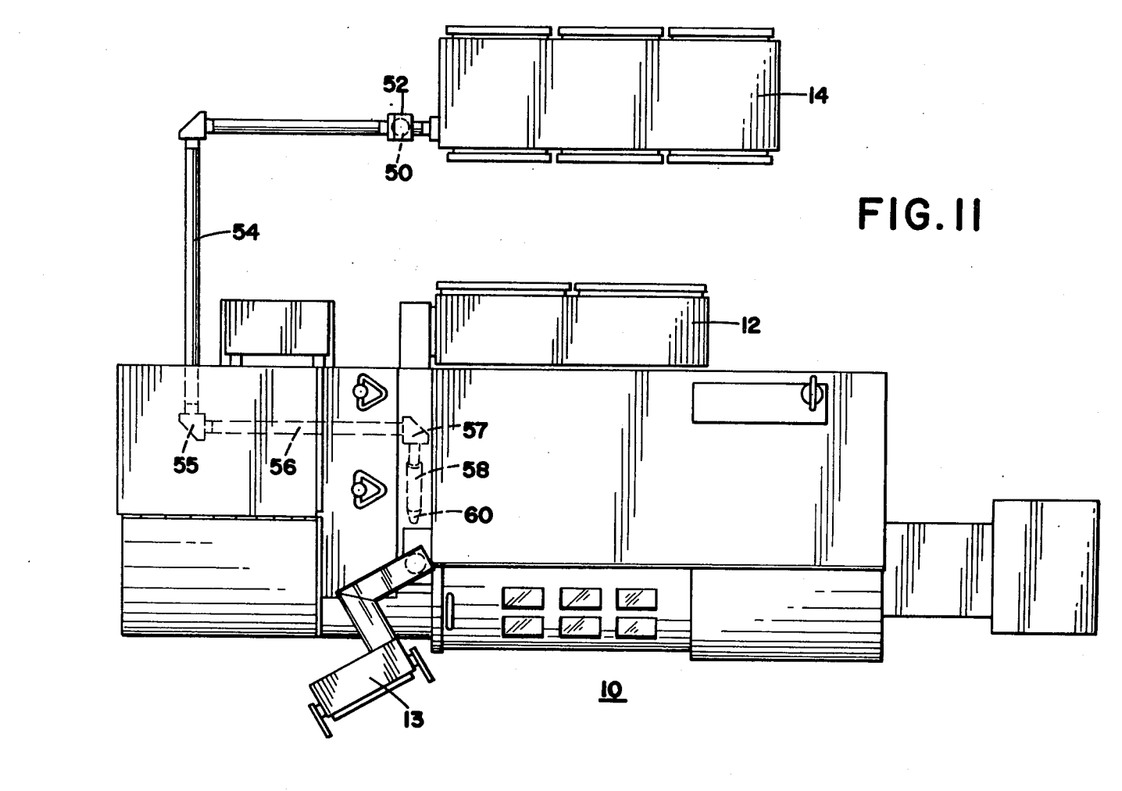
FIG. 11 is a top view of a machine tool according to the present invention showing the laser and NC controller.

Referring now to the drawings and FIGS. 1 and 11 in particular there is shown a machine tool 10 including an NC controller 12 and a laser 14 for heat treating a workpiece 20. Machine tool 10 turns the workpiece 20 to the desired shape and then after completing all turning moves a laser head 60 into position and performs desired surface heat treating on the workpiece 20. A major advantage of the disclosed machine which combines machining and heat treating is the reduction in material handling required to transfer the workpiece to a separate heat treating facility. Depending upon the particular part being produced the potential exists for transferring the finished heat treated part directly from machine tool 10 to a final assembly station. Any material that is conventionally induction heat treatable is laser heat treatable. In addition some materials that are not induction hardenable can be hardened with a laser. The standard machining portion of machine tool 10 is similar to the machine tool described in copending U.S. patent application Ser. No. 199,019 by R. D. Erickson. The machine tool 10 includes a longitudinally extending slant bed section 15 and a head stock section 16. A spindle assembly 18 is mounted on headstock section 16. The spindle assembly 18 is driven to rotate the workpiece 20 about the central axis of the spindle assembly 18. A tool turret assembly 28 and a tailstock 30 are movably mounted on a way block 32. Way block 32 is connected to the slant bed portion 15 of the base of machine tool 10. Way block 32 is provided with ways, extending parallel to the axis of spindle 18, which guide movement of the turret assembly 28 and tailstock assembly 30 relative to spindle assembly 18.

Spindle assembly 18 has a chuck 22 which grips workpiece 20 and rotates it about the spindle longitudinal axis. Chuck 22 is secured to one end of a rotatable spindle member which extends through an opening in headstock 16. The other end of the rotatable member is driven to rotate chuck 22. As the workpiece 20 is rotated by spindle assembly 18 suitable tools mounted on an indexable and positionable tool turret 26, supported from tool turret assembly 28, are moved into position to remove metal from workpiece 20.

A Z axis servo drive motor 34 moves the tool turret 26 along the Z axis, toward and away from the headstock section 16. An X axis servo motor drive 36 is operable to move turret 26 along the X axis, toward and away from the centerline of spindle assembly 18. Turret 26 is supported from an X axis cross slide 38. X axis cross slide 38 is supported from Z axis carriage 40 which is positionable along slant bed portion 15 in response to the operation of servo motor 34. Suitable ways are provided on the Z axis carriage 40 along which X axis cross slide 38 can move. Servo drive motors 34 and 36 may be operated simultaneously at various speeds and selected directions to provide full two axes movement of tool turret 26. An indexing motor 24 is operable to rotatably index tool turret 26 to selected angular positions, about an axis extending parallel to the centerline of spindle assembly 18. Indexing turret 26 brings various tools mounted thereon into proper position to machine workpiece 20 as Z axis drive 34 and X axis drive 36 are operated in response to signals from NC controller 12.

Suitable electric controls are provided in NC controller 12 to control the machining operation of machine tool 10. A pendant mounted operator's panel 13 for NC controller 12 is provided. When the term NC is used herein it is intended to include DNC, CNC, and programmable controls. Suitable NC controllers 12 are produced by various other manufacturers such as G.E., Allen Bradley, or Fanuc. During operation of the machine tool 10, turning and end working tools mounted on tool turret 26 are effective to cut metal from workpiece 20 as it is being rotated by spindle assembly 18. A chip conveyor can be provided to move chips away from the cutting area of the machine tool.

Laser 14 is a high powered CO2 laser such as Coherent Model 525 CO2 laser with a nominal power output of 525 watts continuous. Laser 14 consists of a lasing medium, an output resinator to contain the lasing medium, an exitation source for the lasting medium and an output coupler. For the CO2 laser utilize, the lasting medium consists of a carbon dioxide/helium/nitrogen gas mixture. The gas is contained in a long double walled glass tube. The glass tube having reflecting mirrors mounted at each of its ends comprises the optical resinator of the laser. The exitation source, a relatively high voltage of approximately 40 kv, is applied to the gas mixture to excite the CO2 molecules to a higher energy level. To reach a more stable energy level, the excited molecules emit energy in the form of photons. Each emitted photon stimulates the emission of photons from other excited molecules. Every photon emitted by the excited CO2 molecule has the same wavelength, creating an energy beam that is coherent with respect to time. The mirrors mounted at the ends of the optical resinator reflect the photons travelling parallel to the axis of the resinator. As the photons travel back through the resinator they further amplify the energy content of the beam by stimulating the emission of more photons.

The optical resinator also serves to establish the directional coherence of the laser beam, since all reflected photons are travelling in a direction parallel to the resinators axis. To form an output coupler, one of the end mirros is partially reflective to allow about 5 percent of the laser beam to exit the optical resinator. The remaining 95 percent of the beam continues to stimulate photon emission in the excited CO2 molecules. Due to the high energy content and optical properties of the coherent laser beam, it is possible to reflect and focus the beam to achieve very high energy densities in a selected area on workpiece 20. It is the ability to focus the output energy from laser 14 to small spot sizes that allows the laser to be used for material heat treating. Laser heat treating is not limited to applying hardened case on simple inside and outside diameters, which is where induction hardening is most applicable. Laser heat treating can be applied to a wide variety of workpieces or surfaces having various shapes such as camshaft lobes, crankshaft journals, gear tooth faces, spline faces, keyways, bearing races, threads, and molar shafts.

Figure 2:
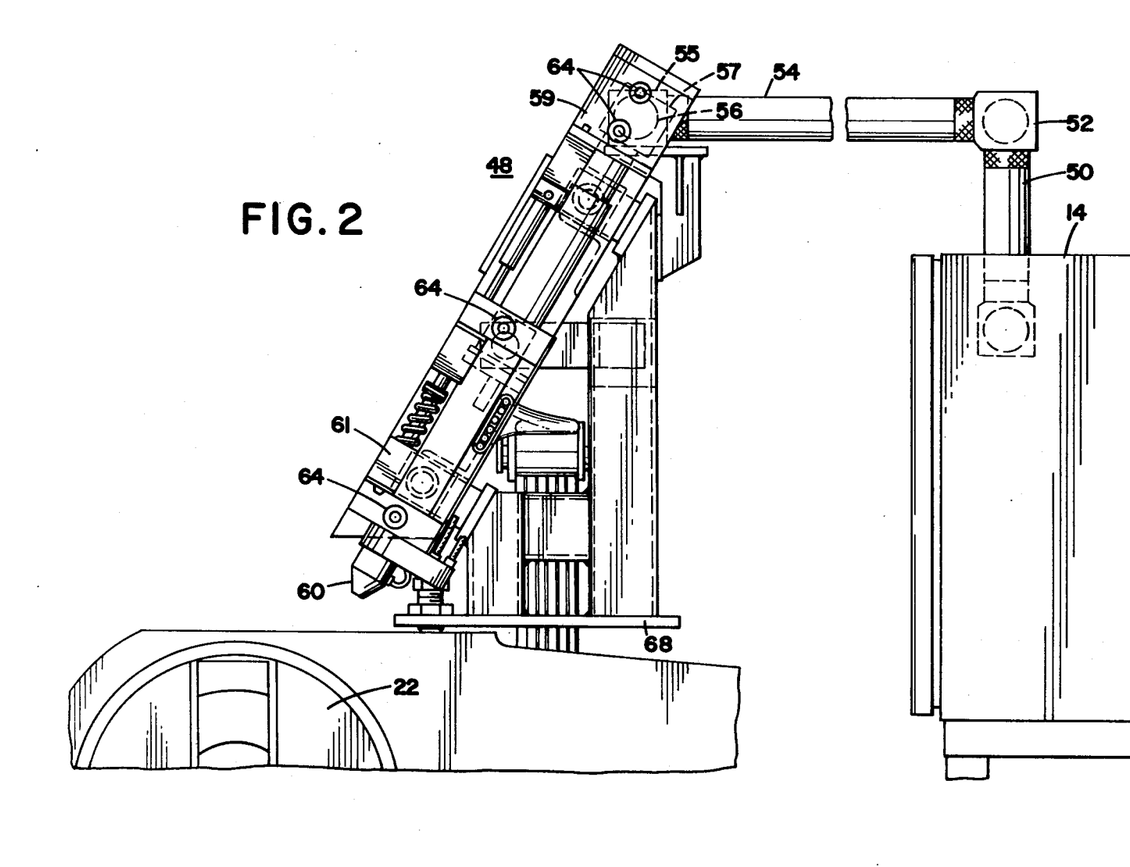
FIG. 2 is a view taken in FIG. 1 along the lines II—II, with the coating nozzle removed for clarity, showing laser beam delivery system and the focusing head.
Figure 3:
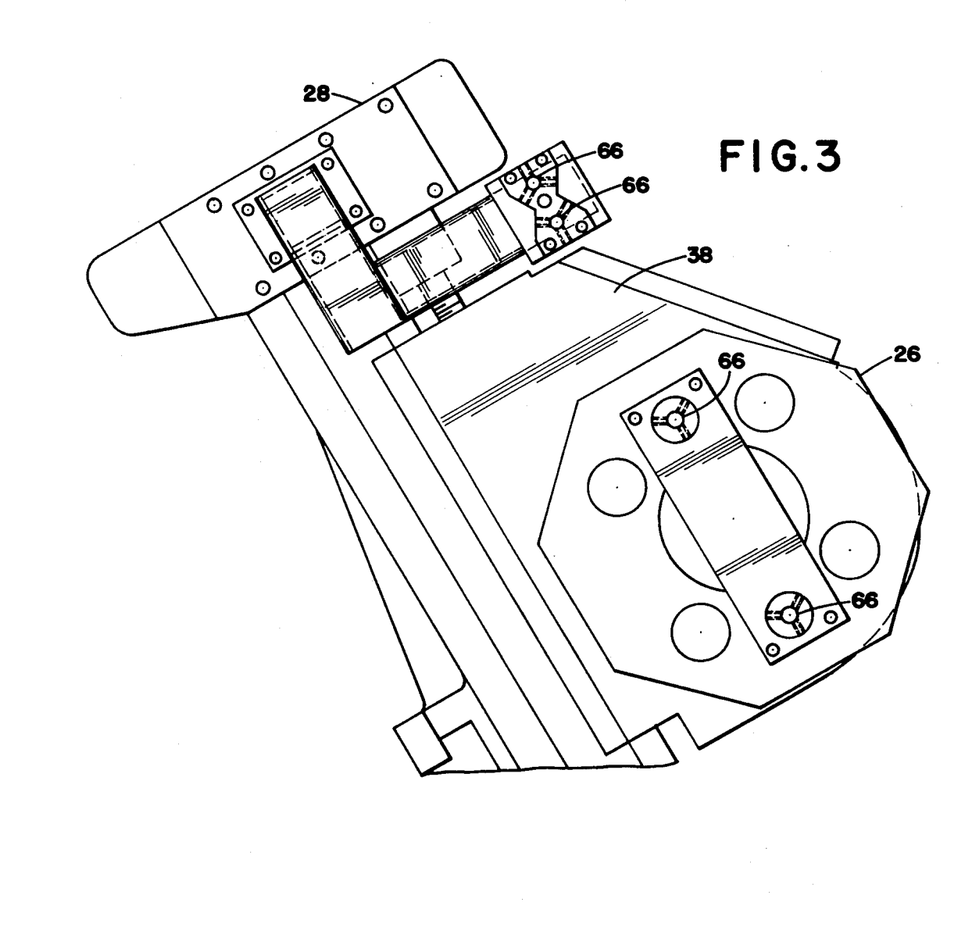
FIG. 3 is a view taken in FIG. 1 along the line III—III showing the tool turret indexed to the proper position for engaging the bracket which supports the focusing head.

Laser 14 includes a source of temperature controlled cooling water which is used to cool various components. The output beam from laser 14 is delivered through protective tubing by reflecting mirrors. As can best be seen in FIGS. 2 and 4 the output of laser 14 is through tube 50 to a suitable reflective mirror 52, through tube 54 to mirror 55, through telescopic tube 56 to mirror 57, and through telescopic tube 58 to focusing head 60. The laser beam output is focused through lenses in head 60. Telescopic beam delivery tubes 56 and 58 allow for two axes movement of focusing head 60. Using the high powered CO2 laser 14 on machine tool 10 permits machining a workpiece and heat treating it on the same machine. As will be described in more detail later the focusing head is engaged and moved by turret 26. The laser beam is delivered from laser 14 to the workpiece through protective aluminum tubes 50, 54, 56, and 58 by a series of water cooled directing mirrors 52, 55, and 57. The horizontal telescoping tube 56 and directing mirror 57, which can be engaged to move with the lathe carriage 40, allows the laser beam to follow the Z axis motion of carriage 40. Telescoping tube section 58 permits the laser beam to follow the X axis motion of cross slide 38 as focusing head 60 is positioned by tool turret 26.

Below the melting point much of the laser energy directed against the metal piece is lost because of reflection. Surface coating the workpiece provides high absortivity of laser energy independent of the surface finish of the workpiece. Heat temperature absorptivity, independent of the metal surface finish, insures good control of process parameters such as depth of penetration, uniformity of penetration and phase transformation of the material. A coating nozzle 62 is provided for depositing a suitable coating on workpiece 20 before laser heat treating.

Beam delivery system 48 is positioned to deliver the focused laser beam to a point above the surface above workpiece 20. The defocusing distance is achieved by proper positioning of X axis cross slide 38. Different power densities can be produced by changing the defocus distance. The disclosed beam delivery system utilizes the positioning accuracy of the NC controlled slide 38 to apply the coating and the laser hardening beam to selected locations on the workpiece 20. A contour that can be generated by the lathe portion of machine tool 10 can be heat treated by laser 14 using NC programming steps similar to those used for generating the part. Positioning of the coating spray nozzle 62 and the laser beam head 60 are compatible with existing NC controls. Beam delivery system 48 is constructed to be left in a parked or home position during metal cutting operations.

After completing all turning operations cross slide 38 is retracted. A protective door 97 is opened to expose the beam delivery system 48. Pneumatic cylinder 63 then pushes a movable bracket 72, which forms part of beam delivery system 48 to the right. The Z axis slide 40 which then moves to its full left position, engaging suitable snap pin connectors, supported from turret 26 and Z axis slide 40, with the beam delivery system 48. Telescopic tube 58 provides for the X axis movement of a bracket 61 which supports focusing head 60 and coating nozzle 62. Bracket 61 is engaged by turret 26 which is supported from cross slide 38. Cross slide 38 turret 26 and bracket 61 are positioned as a unit under control from NC controller 12. Bracket 61 is then moved to properly coat workpiece 20 with a coating material sprayed from spray nozzle 62. Upon completion of the coating, cross slide 38 is moved to selectively heat treat the coated areas. By controlling the rotational speed of the workpiece 20, by the speed of spindle 18, and by controlling the feed rate of cross slide 38 a variety of heat treating patterns can be applied to the surface of workpiece 20. Heat treated patterns that can be generated include spots, axial strips, single revolution strips, multiple paths and spiral or barber pole paths. Various hardening depths can be obtained by varying the treatment rate or spindle speed as well as the power density.

Beam positioning assembly 48 as can best be seen in FIGS. 2 through 5 is moved to direct the laser beam onto the workpiece 20. Four snap pins 64 are provided on the right hand side of assembly 48. Snap pins 64 engage mating female snap pin holders 66 when focusing head 60 is to be positioned. Spring loaded members engage the groove on pin 64 when inserted into snap pin holder 66. Pneumatic slide cylinder 63 is used for extending the movable portion of beam directing assembly 48 so that pins 64 enter and are engaged by snap pin holder 66. Beam directing assembly 48 is secured to the head stock 16 of machine tool 10 by suitable fasteners. Beam directing assembly 48 includes a fixed member 68 which supports a pair of round slide ways 70. A movable bracket 72 is supported from bearing members 74 which engage the round guide rods 70. Bracket 72 is movable to the right from the position shown in FIG. 4 by actuation of slide cylinder 63. The operating rod of slide cylinder 63 is fastened to fixed bracket 68 and as slide cylinder 63 is activated the operating rod extends moving bracket 72 out of a fixed home or parked position. Movable bracket 72 moves to the right and positions pins 64 to engage pin holders 66. With tool turret 26 properly indexed and aligned carriage 40 is moved to the left until pin holders 66 engage pins 64. Focusing head 60 and paint nozzle 62 are supported by bracket 61 and mirror 57 is supported in a bracket 59. Brackets 59 and 61 are locked to bracket 72 when the beam directing assembly is in the home position and when cylinder 63 moves bracket 72 to the right. When pins 64 engage pin holder 66 brackets 59 and 61 are released from bracket 72 and the focusing head 60 can be moved with tool turret 26 to direct the laser beam onto workpiece 20.

Figures 7, 8:
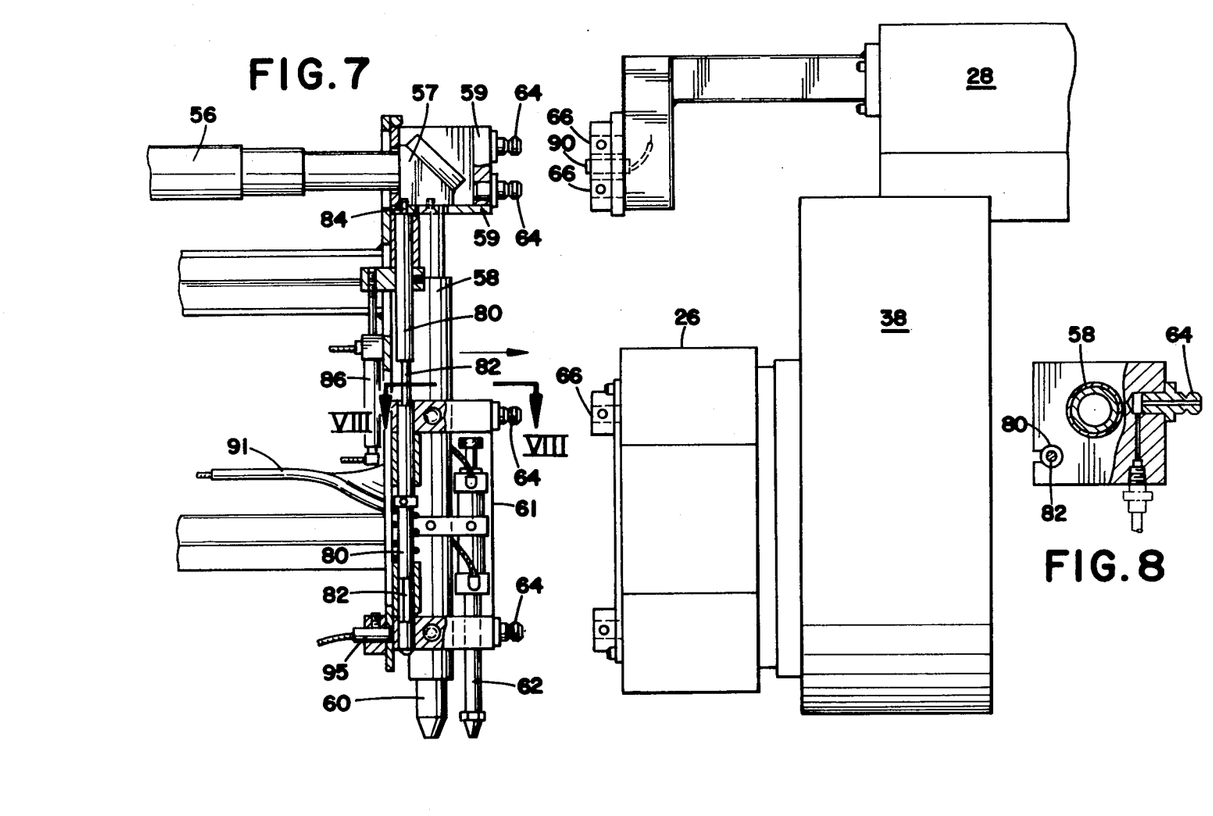
FIG. 7 is an enlarged view showing the snap pins in position to be engaged by the snap pin holders on the tool turret and carriage.
FIG. 8 is a section view in FIG. 7 taken along the VIII—VIII showing an embodiment wherein a fluid path is provided thru the snap pin.
Figure 9:
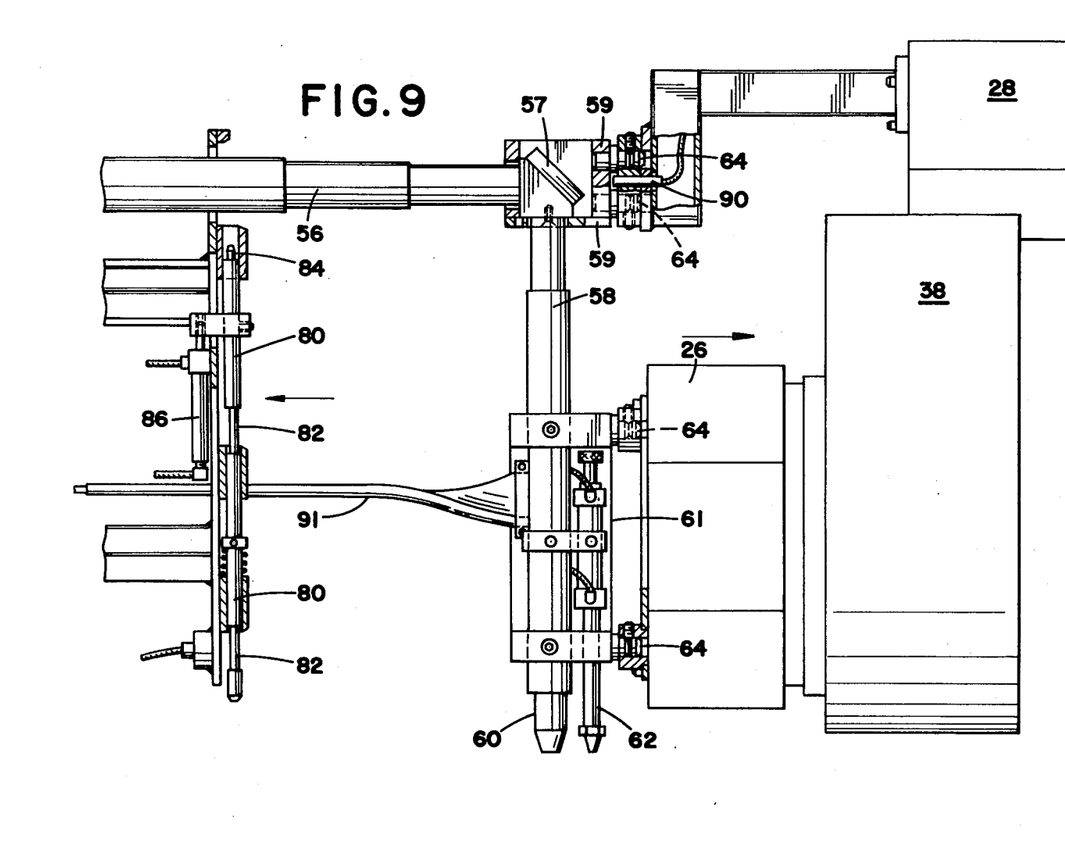
FIG. 9 is a view similar to FIG. 7 but showing the snap pins engaged by the pin holders and the focusing head moved.

The locking assembly for connecting brackets 61 and 59 to bracket 72 can best be seen in FIGS. 7 through 9. The locking assembly consists of a locking rod 80 having two small diameter portions 82 and a top locking pin 84. Rod 80 is positioned by pneumatic locking cylinder 86. Locking rod 80 is spring biased to a raised position locking brackets 59 and 61 to bracket 72. With rod 80 in a raised position pin 84 engages an opening in bracket 59 and a larger diameter portions of rod 80 extend into slotted openings in bracket 61. To release brackets 59 and 61 from bracket 72 pneumatic cylinder 86 is activated to retract its operating rod and lower rod 80.

As can be seen in FIG. 8 when operating rod is lowered small diameter portions are aligned with slotted openings in bracket 61. Locking pin 84 is also withdrawn from the opening in bracket 59. Bracket 59 and bracket 61 are then free to be positioned independent of bracket 71. Telescopic tube 56 permits bracket 59 to be moved with bracket 72 and also away from bracket 72 in Z axis direction. When brackets 59 and 61 are released from bracket 72 telescopic tube 58 permits bracket 61 to be moved relative to bracket 72 and bracket 59 in the X axis direction. Thus bracket 61 is free to follow two axes positioning of tool turret 26.

Referring now to FIG. 8 there is shown an embodiment wherein snap pin 64 has a passage formed therein through which air can be directed to blow away any contaminating chips or debris which may be present on pin 64 or in pin holder 66.

Figure 4:
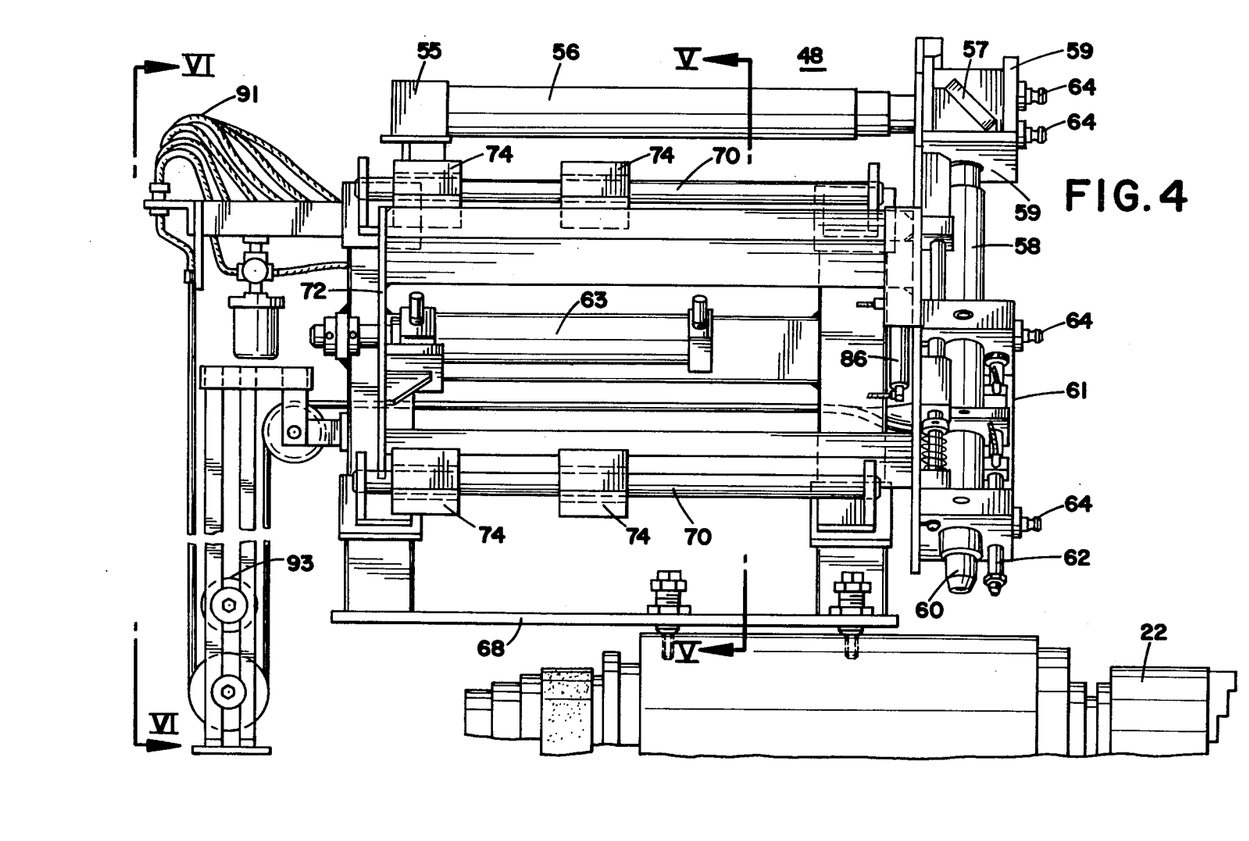
FIG. 4 is an enlarged view of the focusing head and the adjustable beam delivery assembly, including the necessary flexible fluid hoses and their tensioning system.
Figure 5:
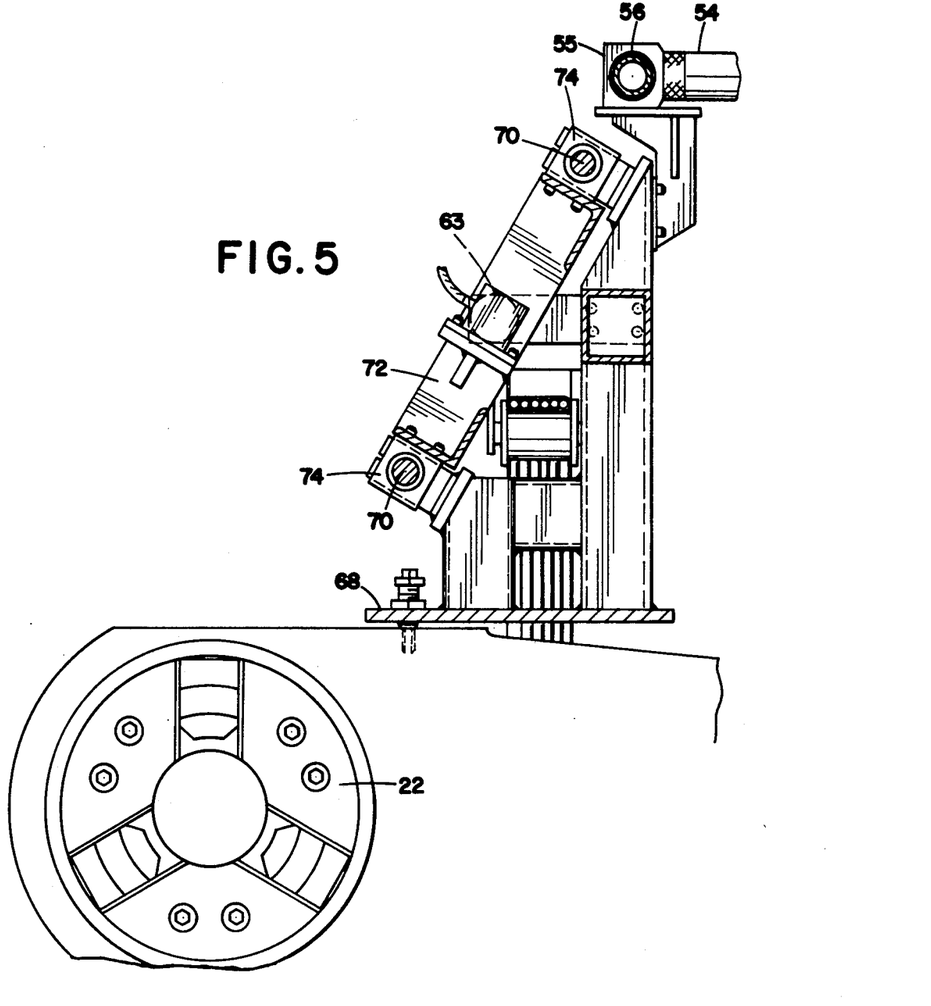
FIG. 5 is a section view taken in FIG. 4 along the line V—V.
Figure 6:
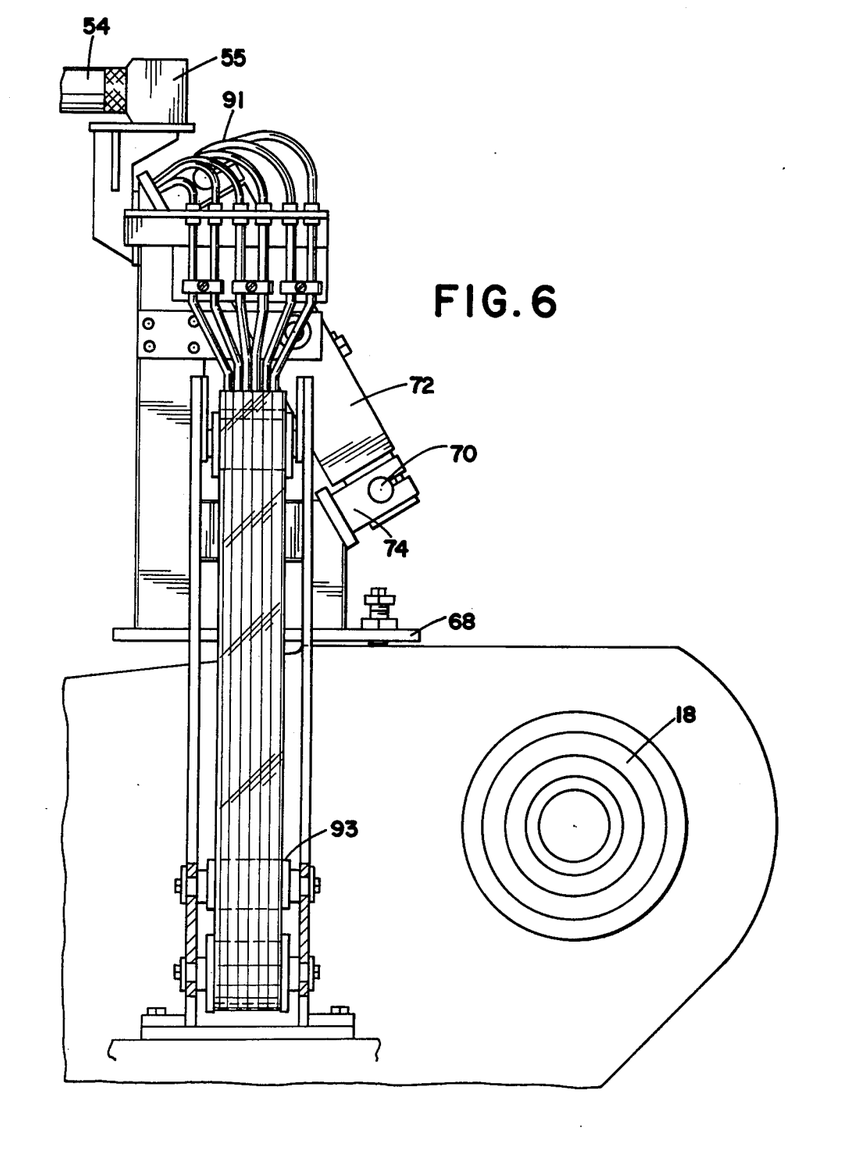
FIG. 6 is a left side view showing the fluid hoses and their tensioning arrangement.

Various flexible fluid connections 91 are required to movable portions of beam directing assembly 48. Air is required for operating slide cylinder 63, locking cylinder 86, and flushing the lens in head 60. Paint and paint air are required at bracket 61 for coating the workpiece 20 through coating nozzle 62. Temperature controlled cooling water from laser unit 14, both feed and return, are required for mirror 57. Air when utilized through pin 64 is also required. A suitable flexible hose tensioning system 93, as shown on the left hand side of FIG. 4, is provided to take up the tension in the various flexible hoses 91. The hose tensioning system 93 can consist of a weight which is raised and lowered as the various flexible hoses 91 are positioned, to maintain a desired tension.

A proximity switch 90 is provided, as shown in FIG. 9 to sense when bracket 72 is extended and pins 64 on bracket 59 are engaged by pin holder 66.

Figure 10:
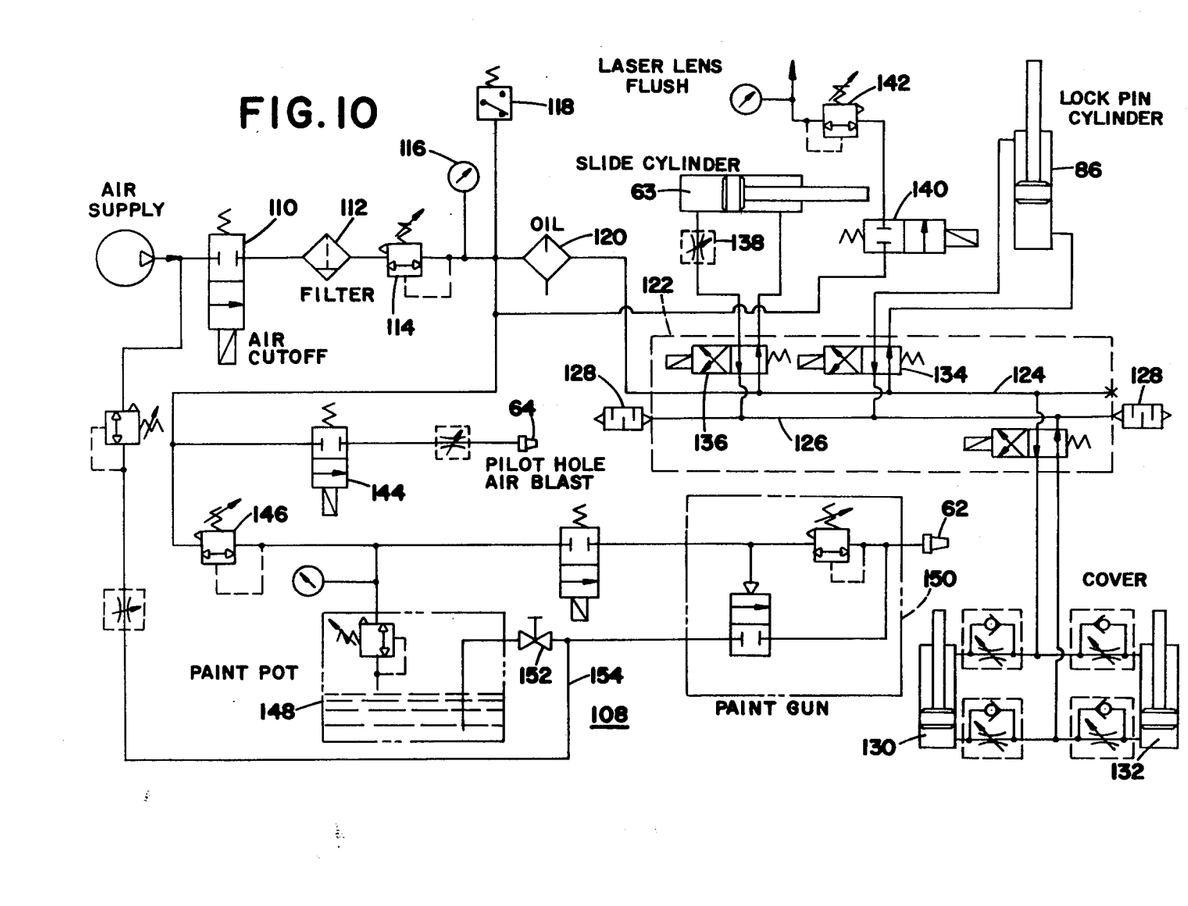
FIG. 10 is a schematic view of the fluid circuit used with the laser beam delivery assembly.

Referring now to FIG. 10 there is shown a pneumatic circuit 108 for operating the beam directing assembly 48, including focusing head 60 and coating nozzle 62.

A suitable plant air supply, at approximately 90 psi, is used for operating the pneumatic circuit. A two way, two position air cutoff solenoid valve 110 is used for switching on air to the pneumatic circuit. A filter 112 is provided for filtering the operating air. A regulator 114 is set to maintain the supplied air at 80 psi. A gauge 116 and a pressure switch 118 are provided at the output of pneumatic regulator 114. A lubricator 120 provides oil lubricant in the air which is supplied to a manifold 122. The manifold includes an air supply passage 124 and a vent passage 126. Mufflers 128 are provided on the output of vent passage 126 to reduce the noise during venting of air to atmosphere.

Figure 12:
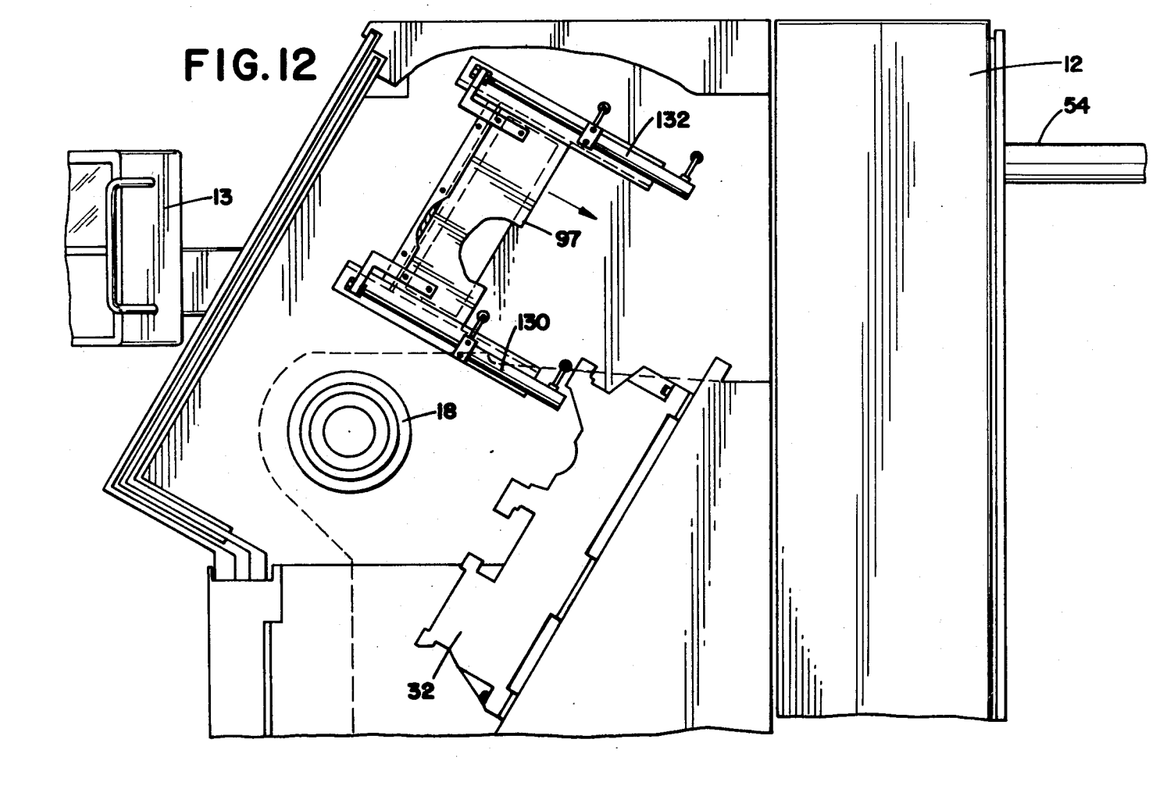
FIG. 12 is a view showing the laser beam delivery assembly in a home position with a protective cover closed.

As can be seen in FIG. 12, a movable cover 97 is provided for covering and protecting the beam focus assembly 48 when it is in its home position. A pair of pneumatic cylinders 130,132 are provided for raising and lowering the cover 97. Suitable adjustable orifices with bypass check valves are provided in the connections to the ports of cylinders 130 and 132. These variable orifices can be adjusted to control the speed of operation of cylinders 130 and 132. With the proper adjustment cover 97 can be moved smoothly and evenly between its open and closed positions by cylinders 130, 132.

A locking pin disengaged solenoid 134, which is a two position four way valve, is provided for extending or retracting locking pin cylinder 86. Operating locking pin cylinder 86 moves locking rod 80 between engaged and disengaged position. A cylinder right solenoid 136, which is a two position four way solenoid valve, is provided for operating cylinder 63. Cylinder 63 is utilized for moving movable bracket 72 between an extended position and a retracted position. An adjustable orifice 138 is provided in the connection to one port of pneumatic cylinder 63 for adjusting its operating speed.

Various connections are made to the air supply before lubricator 120 for utilizing air for operations in which a lubricant is unnecessary or undesirable. A lens flush solenoid 140 provides unlubricated air for flushing the beam focusing lens utilizing in focusing head 60. A pressure regulator 142 is set to maintain the pressure of the air utilized for lens flushing at approximately 5 psi. A two way two position air solenoid valve 144 is provided for switching on air to the openings extending through snap pins 64. This air is turned on before snap pins 64 are engaged by snap connectors 66 to remove any debris which might interfere with making a good connection. A pressure regulator 146, which is set at approximately 25 psi, is provided for supplying air to a sealed paint pot 148. Paint pot 148 contains a suitable coating which is used for covering selected areas of workpiece 20 before laser heat treating. During coating regulated air and paint from paint pot 148 are supplied to the paint gun 150 having an output nozzle 62 which directs coatings onto the areas of workpiece 20 which are to be laser heat treated. A gate valve 152 is provided for closing off the paint from paint pot 148. Air line 154 is provided at the outlet of gate valve 152 for purging coating from the paint gun system. The various solenoid valves utilized in the pneumatic circuit 108 are controlled by commands from the NC controller 12 so that the beam focusing assembly 48 and the coating apparatus operate compatibly with the other moving members, and their associated drives, on machine tool 10.

Utilizing a laser on machine tool 10 for heat treating eliminates part handling of transferring the workpiece to a separate heat treating operation, that would normally be required with a conventional turning machine. Utilizing the laser for heat treating reduces or eliminates post heat treating processing steps such as grinding, honing, and straightening. The workpiece 20 can be heat treated in machine tool 10 immediately after turning and coating and is then available to be transferred to the next production area. By coupling bracket 61 to turret 26 the coating spray equipment and the laser beam focusing head are controlled by the machines standard NC control system. The disclosed machine is compatible with existing NC/CNC/DNC controls.

Suitable coating materials are black paint and colliodal graphite. With the automatic coating system selective spraying of the workpiece is accomplished. Spray nozzle 61 can proceed ahead of the laser beam to coat and heat treat in a single pass. Alternately the part can be coated first and then heat treated. The same program can be used for controlling positioning of bracket 61 for coating and heat treating.

We claim:

1. A machine tool having a workpiece holding device (22) for holding a workpiece (20); a tool support (26), holding a tool which contacts the workpiece (20) for metal removal, positionable along at least two axes in response to signals from a controller (12); characterized by:
    a laser (14) providing a laser beam output;
    laser beam delivery means (48) comprising a focusing head (60) and beam directing means for directing the laser beam to said focusing head and being positionable to permit said focusing head to move along at least two axes; and
    connecting means (61, 64, 66) for connecting said focusing head (60) to said tool support (26), when it is desired to direct a laser beam onto the workpiece (20), permitting said focusing head (60) to be positioned with said tool support (26) in response to signals from said controller (12).

2. A machine tool as claimed in claim 1 characterized by:
    said connecting means comprises a bracket (61) which supports said focusing head (60);
    a coating nozzle (62) supported on said bracket (61) in close proximity to said focusing head (60); and
    coating supply means (148) connected to said coating nozzle (62) for supplying coating for the workpiece.

3. A machine tool as claimed in claim 2 characterized by:
    positioning means (63) for moving said laser beam delivery means (40) between a retracted home position and an extended position where said connecting means (61, 64, 66) can connect said focusing head (60) to said tool support (26).

4. A machine tool as claimed in claim 3 wherein said connecting means comprises:
    snap pins (64) attached to the bracket (61); and
    snap connectors (66), for engaging said snap pins (64), disposed on said tool support (26).

5. A machine tool as claimed in claim 2 wherein said coating supply means comprise:
    flexible hoses (91) for connecting air and coating from suitable supplies; and,
    a hose tensioning system (93) for taking up slack in said flexible hoses.

6. A machine tool as claimed in claim 1 wherein said connecting means is characterized by:
    a plurality of snap pins (64);
    a plurality of mating snap connectors (66) for receiving and engaging said snap pins (64) ; and,
    a passage through said snap pins (64) through which pressurized air can be directed to remove debris.

7. A machine tool for removing metal from and heat treating a workpiece comprising:
    workpiece clamping means for engaging the workpiece;
    a tool for removing material from the workpiece;
    tool positioning means for supporting and moving said tool into engagement with the workpiece to remove material therefrom;
    a laser providing an output laser beam;
    a head for focusing the laser beam;
    means for connecting the head to said tool positioning means for moving the head into a desired position with respect to the workpiece;
    beam delivery means connecting said laser output to said head and being positionable to allow said head to be positioned with said tool positioning means; and
    a home position wherein said head is stored when not engaging said tool positioning means.

8. A machine tool as claimed in claim 7 comprising:
    a bracket for supporting said head;
    a coating spray nozzle supported on said bracket in close proximity to said head;
    coating supply means connected to said coating nozzle for permitting coating of the workpiece with a selected coating before laser heat treating.

9. A machine tool as claimed in claim 7 comprising:
    a cover for covering said head in the home position.

10. A machine tool as claimed in claim 7 wherein said beam delivery means comprises:
    a first telescopic beam delivery tube permitting movement of said head in an Z axis direction; and,
    a second telescopic beam delivery tube permitting movement of said head in an X axis direction.

11. A machine tool for turning and heat treating a workpiece comprising:
    a base supporting a head stock having a driven spindle;
    a chuck, connected to said driven spindle, for gripping and rotating the workpiece;
    an indexable tool turret which is indexable to bring selected tool into position for machining the workpiece;
    a cross slide supporting said indexable tool turret for movement along one axis;
    a carriage supporting said cross slide and movable along another axis;
    a controller for controlling indexing and positioning of said indexable tool turret;
    a laser providing a high energy laser beam output;
    a beam focusing head;
    telescopic tube connecting means for connecting the output of said laser to said beam focusing head and being adjustable along at least two axes; and, connecting means for connecting said beam focusing head to said indexable tool turret to be positioned as the tool turret is positioned in response to signals from said controller.

12. A machine tool as claimed in claim 11 comprising:
a coating spraying nozzle fixed with respect to said beam focusing head and connected to a suitable coating supply for coating the workpiece.

13. A machine tool as claimed in claim 12 comprising:
locking means for locking the beam focusing head against movement with said indexable tool turret.

14. A machine tool comprising:
a driven spindle for supporting and rotating a workpiece;
an indexable tool turret movable along two axes with respect to the workpiece supporting tools which engage and remove material from the workpiece;
a laser which supplies an output laser beam;
a focusing head for focusing the output laser beam;
a beam directing tube means adjustable along two axes for directing the laser beam to said head and permitting two axes of movement of said head;
means for connecting said head to said indexable tool turret so said head can move along two axes with said tool turret; comprising,
a first bracket movable between a retracted position and an extended position, and
a second bracket, supportable from said first bracket, supporting said focusing head and said coating nozzle and being engagable by said indexable tool turret to be positioned therewith.

15. A machine tool as claimed in claim 14 wherein said connecting means comprises:
a plurality of snap pins,
a mating plurality of snap pin connectors for engaging said snap pins.

16. A machine tool comprising:
a driven spindle for supporting and rotating a workpiece;
an indexable tool turret movable along two axes with respect to the workpiece supporting tool which engage and remove material from the workpiece;
a laser which supplies an output laser beam;
a focusing head for focusing the output laser beam;
a beam directing tube means adjustable along two axes for directing the laser beam to said head and permitting two axes movement of said head;
means for connecting said head to said indexable tool turret so said head can move along two axes with said tool turret;
a coating nozzle supporting in close proximity to said head and movable with said head;
coating supply means connected to said coating nozzle for providing a coating which can be applied to the workpiece as said coating nozzle is positioned with said head.

17. A machine tool as claimed in claim 16 comprising:
a home position wherein said head and coating nozzle are parked when disengaged from said tool turret and not in use.

18. A machine tool as claimed in claim 16 comprising:
a plurality of flexible hoses for supplying necessary air and coating for said coating nozzle and said focusing head, and cooling water for said beam directing tube means; and,
hose tensioning means for taking up slack in said plurality of flexible hoses as said focusing head and said coating nozzle are moved.

19. A numerically controlled turning machine having a driven spindle for engaging and rotating a workpiece to be machined and a tool turret movable along two axes, in response to commands from a controller, to bring selected tools into engagement with the workpiece for material removal the improvement comprising:
a laser providing a high energy output laser beam;
a focusing head for focusing the laser beam;
positionable laser beam directing means for directing the output laser beam to said focusing head;
connecting means for engaging said focusing head to the tool turret permitting positioning of said focusing head by the tool turret in response to commands from the controller.

20. A numerically controlled turning machine as claimed in claim 19 comprising:
a bracket supporting said focusing head;
a coating nozzle supported from said bracket in close proximity to said focusing head;
coating supply means having a coating container remote from said nozzle for supplying coating which is applied to the workpiece through said nozzle.

21. A numerically controlled turning machine as claimed in claim 20, comprising:
a home position where said focusing head is situated when not engaged to the tool turret; and,
a protective cover for said focusing head which is movable between a first position covering said focusing head and a second position exposing said focusing head.

* * * * *